Patented June 28, 1927.

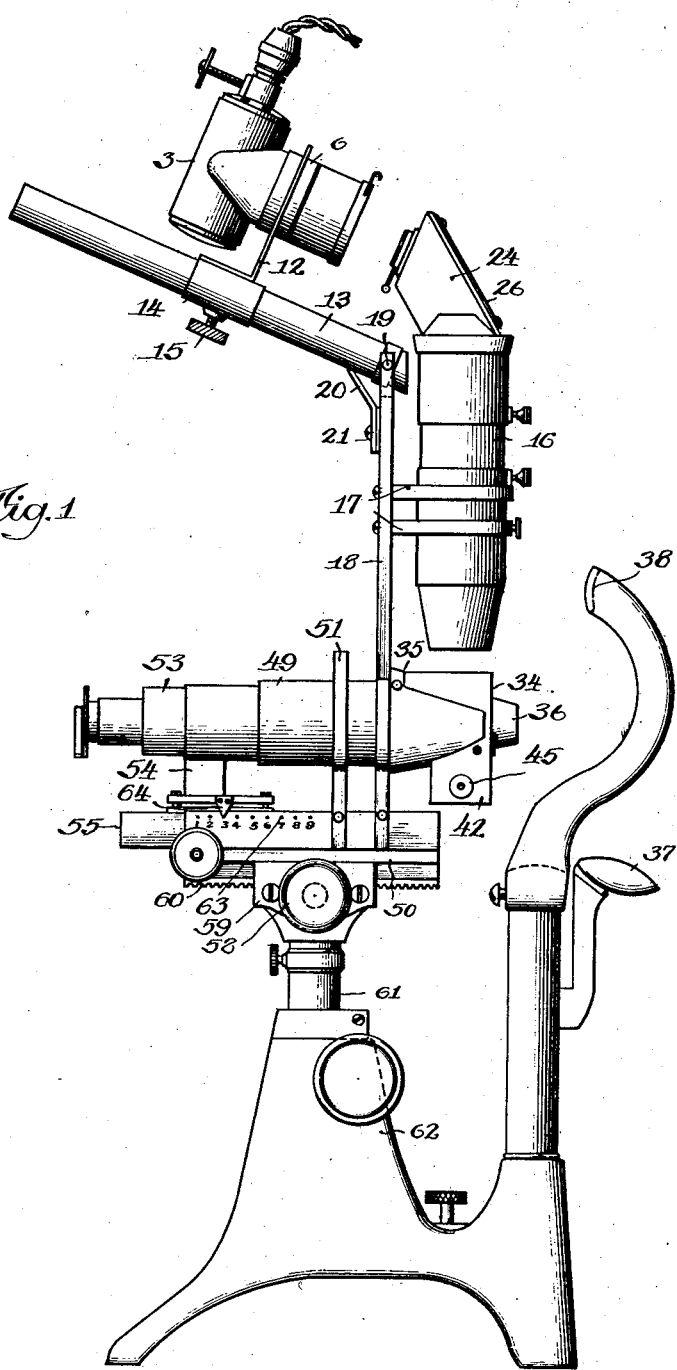

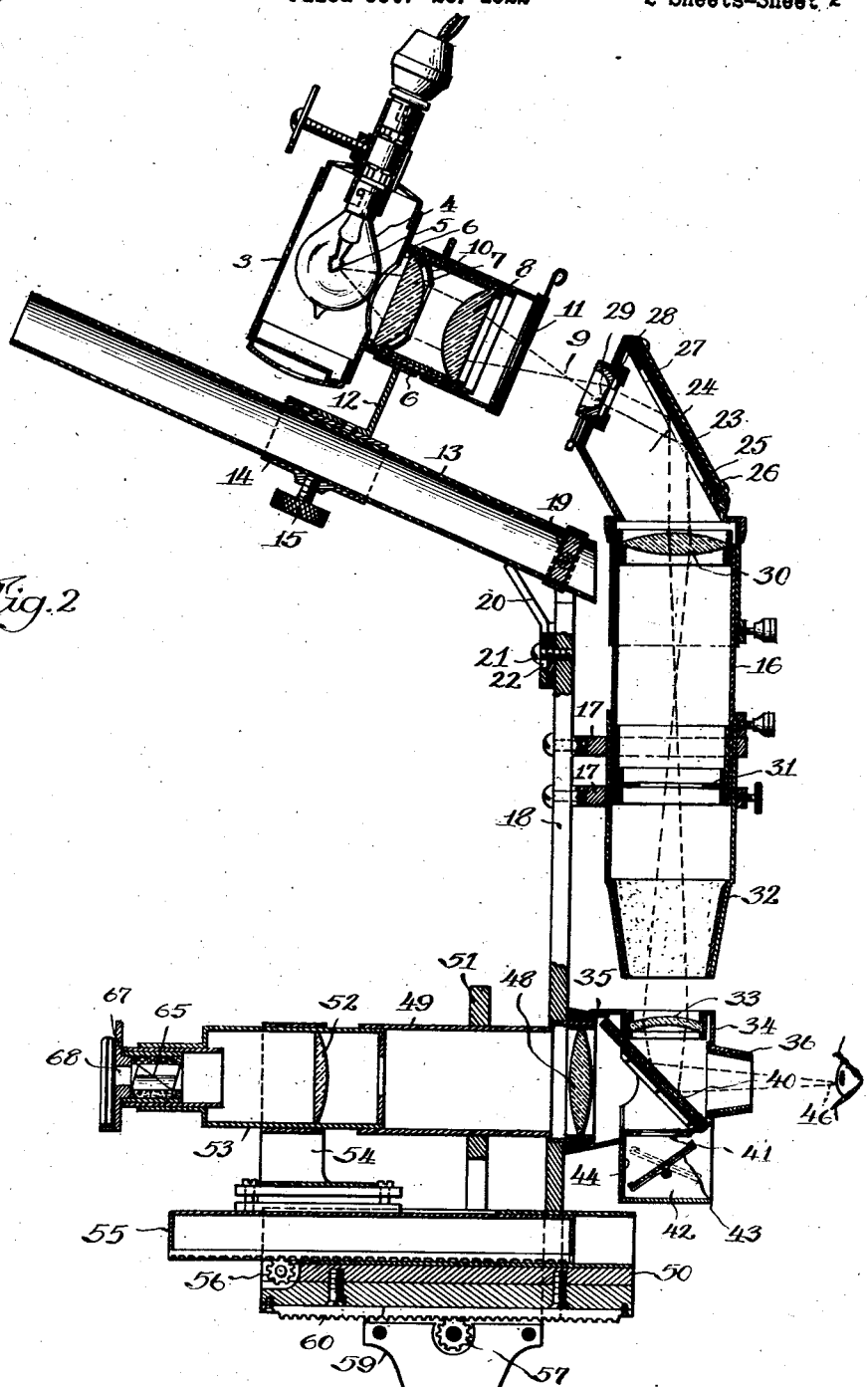

UNITED STATES PATENT OFFICE.

EARL J. BROWN, OF CHICAGO, ILLINOIS.

EYE-TESTING DEVICE.

Application filed October 26, 1922. Serial No. 596,922.

The invention relates to optical instruments and more particularly for examining eyes. The objects of the invention are to provide: an instrument whereby polarized light may be focused to substantially a point at the pupil of the eye for examination thereof without the necessity of dilating the pupil; an instrument in which reflected polarized light is used for examination of the unused eye with means for reflecting the unused portion of the light so it will not interfere with the examination of the eye; an instrument for examining the eye with polarized light by oblique illumination of the eye; an instrument in which polarized light is focused and reflected into the pupil of the eye with a lens-system for viewing the eye which is separate from the focusing means; and an instrument for viewing all the structures composing the reflective media of the eye as well as the retina with polarized light in a manner which permits high magnification. Other objects of the invention will appear from the specification.

The invention consists in the several novel features hereinafter set forth and more particularly defined by claims at the conclusion hereof.

In the drawings: Fig. 1 is a side elevation of an instrument embodying the invention. Fig. 2 is a vertical section.

The invention is exemplified in an instrument comprising a housing 3, containing an incandescent lamp 4 of the type which has a small filament 5 to give intense illumination. A tube 6 is secured to housing 3 and is in communication with the lamp-chamber in the housing. A pair of very strong condenser lenses 7 and 8 are fixed in said tube and are adapted to form a very small image of the lamp-filament at their focal point 9. A diaphragm 10 is provided between the condenser lenses 7, 8 and a diaphragm 11 is provided for the cone of light from the condenser. The lamp-housing 3 and tube 6 are supported by a bracket 12. Said bracket is secured to a sleeve 14 which is slidably mounted upon a tubular bar 13 and is locked in assigned position thereon by a screw 15. This slidable connection permits the lamp-housing and its associated condenser lenses and diaphragms to be adjusted relatively to the polarizer hereinafter set forth.

A light tube 16 is supported by rings 17 which are secured to a standard 18. Bar 13, which supports the lamp-house and associated parts, is pivotally connected at 19 to the upper end of standard 18. A stop 20, adjustably connected to standard 18 by a screw 21 and slot 22, is adjusted to pivotally adjust the bar 13 to correspondingly adjust the angle of incidence of the column of light passing from the condensers to the polarizer. The latter consists of a series of glass plates which are firmly and tightly compressed together and are adapted to reflect polarized light. A sheet of glass 23, say one-half millimeter in thickness, bears against an inclined outer side of a housing 24 and a series of thinner glass plates 25 are clamped between plate 23 and a back 26. The thicker plate gives stability to the thinner plates so that the extremely thin plates help to polarize the light, and retain the same plane as the thicker plate. Housing 24 is provided with opening 27 under the glass plates. The back 26 is suitably secured to said housing so it will clamp the plates together. Black velvet, to render the back non-reflective, is interposed between the outer polarizer plate and the back, or, if desired, black glass may be used in lieu thereof for this purpose. A diaphragm 28 is mounted in housing 24 behind a strong plus-lens 29 to partially or completely parallel the rays of light before they contact with the polarizer. The condensers 7 and 8 focus the light at a point a short distance from and forwardly of lens 29 and the latter partially or completely parallels the rays of light before they contact with the polarizer. A characteristic of a polarizer formed of superposed plates of glass is that the cone or column of light, after being polarized, maintains a more circumscribed cone or column that can be again focused to a smaller or more nearly round area which is very advantageous in making examinations where it is desired to project the maximum amount of light through a small orifice. The plates of glass are set at or beyond the polarizing angle of $57\frac{1}{2}°$ to the incidence rays when three or more plates are used.

A convex lens 30 is secured in tube 16 to collect or collimate the cone or column of light after it has been polarized. A diaphragm 31 is fixed in light-tube 16 to prevent light reflection. The inside of the light-tube is treated to render it non-reflective and the lower portion thereof may, if desired, be covered with black velvet 32.

A dark chamber 34 is formed in a housing 35 and a condensing-lens 33 is mounted at the top of said chamber to re-focus or re-converge the collimated light from the lens 30. An open tube 36 is mounted in the back wall of the housing 35 to permit light to pass to the eye under observation in a position fixed by a suitable chin-rest 37 and head-support 38. A reflector 40, consisting of a thin piece of flat glass is set at an angle of 45° to the incident cone of light from the re-focusing lens 33. This reflector is partially transmissive and partially reflective so that a portion of the light from lens 33 will be reflected through tube 36 to the eye under observation and the remainder will pass through the reflector and thence through an opening 41 to a chamber 42 which is disposed below chamber 33. A tiltable mirror 43 is mounted in chamber 42 and the light transmitted through the reflector strikes this mirror. When the mirror is positioned as shown in full lines (Fig. 2), the light is reflected to the wall 44 of chamber 42 which is lined with suitable material to absorb the light cone. This exemplifies means for disposing of the light transmitted by the reflector 40 while the reflected light is projected to the eye under observation. When the mirror 43 is shifted by means of a knob 45 on the pivot thereof, to approximately the position shown in dotted lines (Fig. 2), the light will be reflected obliquely to the eye under observation which is at different angles, as necessary when viewing the cornea iris and lens by oblique illumination.

This construction exemplifies means for examining the eye by oblique illumination. The light cone reflected in direct examination is indicated by dotted lines 46. The cone of polarized light, which has been re-focused by lens 33 and which is reflected by glass plate 40, is brought to a sharp focus within the eye under observation, so that it will pass through the pupil and illuminate the back of the eye. As a result, a comparatively large area of the retina will be illuminated for observation.

The emergent cone or column of light from the eye, after the retina has been illuminated by the reflected portion of the column of polarized light, passes backwardly along the same general course of the incident light and the greater portion passes through reflector 40 to a supplementary lens 48 which partially focuses the emergent light. Lens 48 is fixed in a stationary tube 49 which is rigid with standard 18 and is secured to a head 50 by a bracket 51. Lens 48 converges the emergent light into an eye-piece lens 52 and it also assists in magnifying the images of the retina of the observed eye. Lens 52 is mounted in a tube 53 which is slidably mounted in tube 49. Lens 52 focuses the image of the retina of the observed eye. It is adjustable relatively to lens 48 so that the distance between lenses 52, 48 may be varied to compensate for refractive errors through any observed eye or the observing eye of the operator. For this purpose, tube 53 is fixed to a bracket 54 on rack-bar 55 which is horizontally movable in the head 50. The pinion 56 engages a rack on the underside of bar 55 to shift the tube 53. The head 50 is horizontally adjustable to the eye under observation so that the entire lens system and polarizer may be adjusted to properly focus the reflected light in the eye under observation. A pinion 57, engaging with a rack 60 fixed to head 50 and rotatable with a thumb-wheel 58 and journalled in a guide-bracket 59, serves to shift the entire structure relatively to the eye under observation. Guide-bracket 59 is secured to a post 61 which may be vertically adjusted in a supporting base 62 which also carries the chin-rest 37 and the head-rest 38. A scale consisting of indications 63 on the head 50 and an index 64 carried by bracket 54 is provided to indicate the amount of the refractive error of the observed eye.

An analyzer, such as a Nicol's prism 65 or a tormaline plate is held in an eye piece tube 67 which is in tube 53, so that all reflected polarized light may be eliminated and so that the image of the retina may be viewed without the annoyance caused by reflecting surfaces in ophthalmoscopic examination. A peep-hole 68 is formed in the outer end of eye-piece 67 through which the observing eye receives the emergent light from the retina of the observed eye. To view the construction of the eye in front of the retina under observation by trans-illumination, it is only necessary to substitute for the eye-piece 67 a more powerful eye-piece and withdraw the instrument away from the observed eye and also increase the distance between the lens 52 and lens 48. After bringing the cornea of the observed eye into focus and knowing its condition, then by gradually advancing lens 52 toward lens 48, any opacities in the aqueous humor may be viewed. By gradually bringing lens 52 and lens 48 together or advancing all of the parts on head 50 by pinion 57 and rack 60, the iris may be examined under high magnification and any opacities in the lens or vitreous chamber may be discovered. To examine the cornea, iris and lens by oblique illumination, the reflector 40 will be removed from the chamber 33, it being removably held therein for this purpose, and by tilting the reflector 41 to the position indicated by dotted lines in Fig. 2, the entire column of polarized light will be reflected into the eye under observation. Obviously, a binocular eye-piece of well known construction may be substituted for the eye-piece shown, if a binocular view of the image of the retina in the observed eye is desired or a photographic instrument may be connected to the eyepiece, if a photograph of the retina of the observed eye is desired.

The invention exemplifies an optical instrument, in which polarized light is focused to substantially a point at the pupil of the eye so that it is not necessary to dilate the pupil for examination; in which the rays of light are parallelized between the condenser and the polarizer; in which the transmitted light of the partially transmissive reflector is reflected out of the line of observation to prevent its interference with the examination of the eye under observation; in which provision is made for examining the eye with polarized light by oblique illumination and in which the lens-system for viewing the eye is separate from the lens-system for focusing the polarized light into the eye.

The invention is not to be understood as restricted to the details set forth, since these may be modified within the scope of the appended claims, without departing from the spirit and scope of the invention.

Having thus described the invention, what I claim as new and desire to secure by Letters Patent, is:

1. In an eye testing device, an optical lens system for observing the eye, a light transmission mirror disposed obliquely across the path of observation of said system and between said system and the eye under examination, means for projecting a beam of polarized light upon said mirror in such a manner that it will be reflected into the eye under observation, and an analyzer included in the lens system.

2. In an eye testing device, an optical lens system for observing an eye, a source of polarized light, means comprising in combination a positive lens and an adjustable partially reflecting mirror positioned optically adjacent said eye for directing a beam of said polarized light to the eye under observation from a position without and separate from the system, and an analyzer arranged for use in the lens system.

3. In an eye testing device, a lens system for observing an eye, a source of light, a polarizing mirror, lens means for directing light beams from said source in parallel directions upon said mirror so as to cause a polarized parallel beam of light to be reflected by said mirror, means separate from said lens system for refracting said beam to converge, means for directing said converging beam to the eye under observation, and an analyzer arranged for use in said lens system.

4. In an eye testing device, an optical lens system for observing an eye, a light transmissive mirror removably disposed obliquely across the line of vision of said lens system, means for directing a beam of polarized light upon the mirror, at an angle such that the reflected beam will enter the eye under observation, a tiltable mirror mounted at one side of the light transmissive mirror so as to receive the beam of polarized light when the light transmissive mirror is removed and reflect it obliquely to the eye under observation, and an analyzer associated with the lens system.

5. In an eye testing device, an optical lens system for observing an eye, a light transmissive mirror removably disposed obliquely across the line of vision of said lens system, means for directing a beam of polarized light upon the mirror at an angle such that the reflected beam will enter the eye under observation, a tiltable mirror mounted at one side of the light transmissive mirror so as to receive the beam of polarized light when the light transmissive mirror is removed and reflect it obliquely to the eye under observation, and an analyzer associated with the lens system, said tiltable mirror being adjustable into such a position that any transmitted light received thereon from the light transmissive mirror during examination of the eye by the transmissive mirror will be reflected in such a direction as not to interfere with said examination.

6. In an optical instrument, a device for viewing the retina of a patient's eye and means comprising a positive lens and a partially reflecting mirror, said lens having a focal length approximately the same as the optical distance from the optical center thereof to the nodal point of a positioned eye for directing into said patient's eye a beam of light converging to a focus in front of the nodal point of the refracting system of the eye, whereby the rays of said beam will cross and spread out over the back of the eye and illuminate a relatively large area.

7. In an optical instrument, the combination of illuminating means, a polarizer for the light from the illuminating means, partially transmissive means for reflecting a portion of the polarized light to an eye under observation, and means to dispose of the transmitted light to prevent its interference with the examination of the observed eye.

8. In an optical instrument, the combination of illuminating means, a polarizer for the light from said means, a partially transmissive means for reflecting a portion of the polarized light to an eye under observation, and means to reflect the transmitted light out of the line of observation to prevent its interference with the examination of the observed eye.

9. In an optical instrument, the combination of illuminating means, a polarizer for light from the illuminating means, partially transmissive means for reflecting a portion of the polarized light to an eye under observation, a dark chamber for the transmitted light, and a reflector to receive the transmitted light and reflect it into said dark chamber and prevent interference with the examination of the observed eye.

10. In an optical instrument, the combination of an illuminating means, a polarizer for the light from said means, and a reflector for the light from the polarizer for oblique illumination of an eye.

11. In an optical instrument, the combination of an illuminating means, a polarizer for the light from said means, and a movable reflector for the light from the polarizer for oblique illumination of an eye.

12. In an optical instrument, the combination of illuminating means, a polarizer, partially transmissive and removable means for reflecting polarized light into an eye under observation, and a reflector for the transmitted polarized light movable to reflect the unused light so it will not interfere with the examination of the eye and for oblique illumination of the eye when the partially transmissive means is removed.

13. In an optical instrument, a lens system for viewing the eye, a partially transmissive element disposed obliquely across the axis of the lens system and through which observation of a patient's eye is carried on, and means comprising a positive lens having a focal length approximately equal to the distance from its optical center to the position of the nodal point of said eye for directing upon said element a converging beam of light which converges to a focus in front of the nodal point of the refracting system of the eye, whereby the rays constituting said beam will cross and spread out in the eye and illuminate a relatively large area of the retina for observation by said lens system.

Signed at Chicago, Illinois this 22nd day of August, 1922.

EARL J. BROWN.